United States Patent [19]

Aslin

[11] Patent Number: 5,028,318
[45] Date of Patent: Jul. 2, 1991

[54] CYCLONIC SYSTEM FOR SEPARATING DEBRIS PARTICLES FROM FLUIDS

[75] Inventor: David J. Aslin, Norristown, Pa.

[73] Assignee: Aeroquip Corporation, Jackson, Mich.

[21] Appl. No.: 340,503

[22] Filed: Apr. 19, 1989

[51] Int. Cl.$^5$ .............................................. B01D 17/038
[52] U.S. Cl. ................................. 210/85; 29/DIG. 6; 55/205; 209/211; 210/188; 210/512.1
[58] Field of Search ............ 55/204, 205, 459.1–459.5; 210/85, 188, 303, 304, 305, 512.1, 512.3, 739, 787, 788, 86; 209/211, 144; 29/402.08, DIG. 6, 279

[56] References Cited

U.S. PATENT DOCUMENTS

| 3,878,103 | 4/1975 | Miller et al. | 210/85 |
| 4,199,443 | 4/1980 | Tauber | 210/512.1 |
| 4,224,143 | 9/1980 | Liller | 209/144 |
| 4,282,016 | 8/1981 | Tauber et al. | 210/512.1 |
| 4,317,716 | 3/1982 | Liller | 209/211 |
| 4,596,586 | 6/1986 | Davies et al. | 55/459.5 |
| 4,670,161 | 6/1987 | Hayatdavoudi | 210/512.1 |
| 4,707,165 | 11/1987 | Tauber et al. | 55/204 |
| 4,795,561 | 1/1989 | Aslin | 55/204 |

FOREIGN PATENT DOCUMENTS

| 764727 | 9/1980 | U.S.S.R. | 210/512.1 |
| 797781 | 1/1981 | U.S.S.R. | 210/512.1 |

Primary Examiner—Frank Spear
Assistant Examiner—Joseph Drodge
Attorney, Agent, or Firm—Lipton & Famiglio

[57] ABSTRACT

This invention discloses a particle separator adapted for use in a pressurized lubrication system for mechanical drives to separate debris particles from the fluid. Fluid tangentially injected into the housing impinges on the inner cylindrical wall in a manner which develops a downwardly directed spiral flow pattern, which generates a centrifugal force which firstly causes the entrapped gases to coalesce substantially in the center of the flow pattern and secondly selectively propels debris particles to the outer reaches of the pattern where the debris particles are segregated and trapped in a debris channel for subsequent removal from the system. A debris exit extends tangentially through the cylindrical wall. Apparatus for detecting and indicating the presence of debris particles, e.g. a magnetic particle detector, eddy current sensor, or optical particle detector, is preferably connected to the debris outlet. Outlets for the injected fluid and separated gases are also provided.

24 Claims, 7 Drawing Sheets

CYCLONIC SYSTEM FOR SEPARATING DEBRIS PARTICLES FROM FLUIDS

BACKGROUND OF THE INVENTION

This invention relates generally to particle separators of the type described in U.S. Pat. No. 4,199,443, and to combination particle detectors and foam separators of the type described in U.S. Pat. No. 4,282,016, the disclosures of which are incorporated herein by reference. Such devices are used in conjunction with hydraulic and lubrication systems for mechanical equipment which utilize a fluid such as oil. In particular, apparatus of the present invention selectively removes particles above a predetermined size in the oil of such systems. Preferred embodiments of the invention also remove air and other trapped gases from the fluid and vents them from the system.

Mechanical power transmission equipment is subject to wear due to abrasive friction, caused by the contact of moving parts under pressure or load at high relative speeds. This results in the release of a quantity of small particles. Such "wear particles" or "fuzz" are generally 2 to 20 microns in size. Particles of this size, when suspended in a circulating fluid such as heavy lubricating oil generally move with it rather than reacting promptly to gravity and inertial forces. However, once normal "wear in" occurs, the quantity of such particles reduces to a relatively low value, and in most systems, they are readily removed from the system by filters or, if the particles are ferrous, by magnets.

When the components of the power-transmitting system which is being lubricated become overloaded or when localized areas U.S. Pat. application of Aslin for Cyclonic System etc. of weakness occur, the situation changes radically. In such cases, much larger particles of material become loosened, generally at the point of contact between moving parts under high surface pressure. Furthermore, once the surface has been deformed by the breaking off of such particles, the rate of deterioration is accelerated, resulting in the breaking off of additional particles at increasing rates. These "failure particles" are generally of a much greater order of magnitude in size than the "wear particles" referred to previously. In addition, the quantities of wear particles produced are substantially increased. Failure particles generally fall into the 100 to 2000 micron size range. Due to their greater mass, they are less subject to being suspended in the lubricating fluid.

It is well known that the structural failure of drive train components may be predicted in advance of such failure by monitoring the condition of the lubricating oil. Such structural failure is indicated when metallic particles in the size range of failure particles, i.e. greater than 100 microns, are detected or when the quantity of wear particles substantially increases. The apparatus of the present invention is of the type which separates out such debris particles and provides a signal warning the operator of the occurrence of the situation.

In addition to generating particulate debris, power applications also tend to create a degree of churning of the lubricating fluid, resulting in the formation of foam which is often quite stable. In many systems, equal volumes of air and oil are mixed. In still other high speed applications, such as lubrication of gas turbines, as many as four parts of air may be mixed with one part of oil. Such dilution of the oil results in less oil coming into contact with the surfaces to be lubricated, thus diminishing the overall lubricating effect of the oil—an obviously undesirable result. U.S. Pat. application of Aslin for Cyclonic System etc. Moreover, when air is present in the oil, the fluid becomes compressible, thus lowering the overall pressure in the oil system. This is particularly true when positive displacement-type or centrifugal pumps are used, a common practice in these types of systems. In addition, the cooling effect of the oil is substantially reduced due to more friction because of air entrainment, which increases the probability of overheating and accelerated wear.

SUMMARY OF THE INVENTION

The apparatus of the present invention mechanically separates debris particles from flow, thus increasing the reliability and accuracy of the detection of failure particles by conventional detection equipment. Preferred embodiments of the invention are further adapted to include means for removing air and other entrapped gases from the fluid.

Apparatus of the present invention includes an outer cylindrical housing with two ends that are closed except for certain ports that will be described. Within the housing is a generally cylindrical chamber. For convenience of description, we shall arbitrarily refer to one end of the cylindrical housing as the "top" and the opposite end as the "bottom," although it should be recognized that the apparatus may be deployed and operated in virtually any orientation inasmuch as it is not dependent on gravity.

Inside the housing is a hollow cylindrical tube which is disposed along the axis of the housing and connected to one of the ends. In different embodiments of the invention, the tube may enter the chamber from the top of the housing or from the bottom of the housing. It extends only part way through the housing. Because its purpose is to provide an outlet for gases trapped in the central part of the vortex of U.S. Pat. application of Aslin for Cyclonic System etc. the cyclonic system, the tube is commonly referred to as the vortex finder tube.

Oil or other fluid exits the apparatus through a funnel-shaped mouth in the bottom of the housing. The mouth tapers to communicate with a fluid channel which in turn communicates with a fluid outlet, which is in the bottom element.

A ring extends upwardly from the funnel-shaped mouth at the bottom of the apparatus. The purpose of the ring is to maintain separation of particulate matter, i.e. debris, from the fluid which is directed into the funnel-shaped mouth. Hence it is referred to as a debris ring. The portion of the chamber between the debris ring and the cylindrical wall is an annular channel where the debris migrates before exiting from the chamber. Extending tangentially through the cylindrical wall of the housing from the debris channel is a debris outlet, which communicates with a chamber or underflow port containing means for collecting, retaining, or sensing particulate matter.

Thus the present invention contemplates a particle separator adapted for use in a pressurized three-phase flow system, such as for example a lubrication system for mechanical drives, to separate debris particles from liquids and or gases and to segregate them from flow of fluid for subsequent removal. The separator comprises a housing having a top end cap, a smooth inner cylindrical wall, and a bottom element, which together define a chamber therein. Near the top end cap is one or more fluid inlets adapted to tangentially inject the fluid into the housing near the top end cap and adapted to cooperate with the housing such that when the fluid is injected through the fluid inlet or inlets, it impinges on the inner cylindrical wall in a manner such that a downwardly directed spiral flow pattern is developed, the flow pattern generating a centrifugal force field which U.S. Pat. application of Aslin for Cyclonic System etc. firstly causes the entrapped gases to coalesce substantially in the center of the flow pattern and secondly propels debris particles to the outer reaches of the pattern for eventual separation, capture and removal.

Means for removing fluid from the apparatus include a fluid outlet in the bottom of the housing. The bottom element has a funnel-shaped surface on its interior, extending from a wide mouth beginning near but spaced apart from the inner cylindrical wall and tapering to a narrower fluid channel communicating with the fluid outlet.

Within the chamber is provided means adapted for maintaining the separation of debris particles from the fluid, extending upwards a short distance into the chamber from the mouth and forming an annular debris channel between its exterior surface and the portion of the cylindrical inner wall immediately adjacent to the bottom element. Preferably the means adapted for maintaining the separation of debris particles from the fluid is a ring extending upwardly from the mouth of the funnel-shaped surface. Debris particles are segregated and trapped in the debris channel for subsequent removal from the system.

A debris exit adapted for receiving separated debris particles after they have been propelled out of the flow pattern by the force field comprises a debris outlet from the debris channel extending tangentially through the cylindrical inner wall. A means for detecting and indicating the presence of debris particles, e.g. a magnetic particle detector, eddy current sensor, or optical particle detector, is preferably connected to the debris outlet.

In some embodiments of the present invention, the fluid outlet extends radially through the bottom element to communicate with the fluid channel. In other embodiments, it extends axially therethrough.

In preferred embodiments of the present invention, means U.S. Pat. application of Aslin for Cyclonic System etc. are provided for removing gases entrapped in the fluid. These preferably comprise a gas outlet along the axis of the chamber and a vortex finder, which comprises a hollow tube extending into the chamber concentric with the inner cylindrical wall and communicating with the gas outlet, the tube being adapted to intercept coalesced gases and conduct them into the gas outlet.

In an embodiment of the invention, the gas outlet is in the bottom element, and the vortex finder extends through the fluid channel and above the ring.

In other embodiments of the invention, the air outlet extends through the top end cap. Several optional configurations may be used in this situation. In one, the vortex finder extends below the top of the ring and further comprises an air outlet reversing cap covering and shrouding the bottommost portion of the hollow tube, the bottommost portion of the hollow tube having a plurality of openings formed therewithin.

In another, the vortex finder extends downwardly into the chamber from a gas outlet which may be integral with and extending either upwardly from the top end cap of the housing or upwardly from the top end cap and downwardly into the chamber for a short distance from the top end cap. In these configurations, the vortex finder desirably extends downwardly into the chamber to a terminus lower than the top of the ring, and a gas outlet standpipe extends upwardly from the bottom element through the fluid channel to a terminus slightly above the top of the ring.

Usually, the vortex finder includes means for controlling the flow of gas through the hollow tube, such as a gas outlet orifice plate at the proximal end of the hollow tube.

In operation, a three-phase mixture of air, oil and particles is introduced tangentially into the apparatus of the present invention via an inlet situated at the top of the U.S. Pat. application of Aslin for Cyclonic System etc. chamber. The mixture entering the apparatus is constrained by the chamber, forcing the fluid to flow circumferentially and downwardly. This motion creates a cyclone, in which all phases are impelled outward; however, due to density differences, the heavier (denser) phases displace the lighter (less dense, e.g. gaseous) phases so that the former move outward and the latter move inward. The centrifugal forces tend to cause the debris particles to move radially outwardly and the entrapped air and other gases to move radially inwardly to form a gaseous vortex near the axis of the chamber.

The housing further contains a detection cavity or port formed at its bottom at or near its periphery for receiving debris particles. While normal wear particles, which are suspended in the fluid, travel along with it, the heavier debris particles are forced against the inner surface of the housing by centrifugal force and then down to the bottom of the housing where they are thrust into the detection cavity. Conventional detection equipment within this port is adapted to indicate the presence of debris particles.

The cyclonic motion of the mass flow also serves to separate out the gases. This happens because the entrained gas has a lower specific gravity than the oil and is therefore subject to substantially lower centrifugal force. Consequently the gas, due to being displaced, forms a vortex in the center of the housing and is vented by the vortex finder. The rate of gas venting is controlled through the use of an external pressure valve or fixed orifice, thereby permitting the pressure of the lubrication system to be maintained, while maintaining high separation efficiencies.

It has been found that the air separation efficiency, oil separation efficiency, and debris capture efficiency of the present invention are at least as good as and generally are significantly improved in comparison with conventional U.S. Pat. application of Aslin for Cyclonic System etc. cyclonic deaerating particle separators such as those described in U.S. Pat. No. 4,282,016. It is believed that such improvements in operating efficiency result in great part from the fact that the present invention creates a single downwardly-spiraling cyclonic flow, rather than a cyclonic spiral which first moves downwardly through the chamber and then reaches the shroud at the bottom and reverses direction to form an upwardly moving axial vortex of gas, as found in conventional separators. Also it has been found that the pressure differential between the inlet and the outlets of the apparatus of the present invention is less than that of conventional apparatus. Exit losses are thereby minimized by the present invention.

Accordingly it is an object of the present invention to provide an improved apparatus which will separate failure particles from wear particles in the fluid of a lubricating system for mechanical drives or the like.

It is an additional object of the present invention to provide an improved apparatus which will also separate entrapped gases from the fluid.

A feature of the present invention is a ring extending upwardly from the floor of the chamber, which maintains separation of particulate matter from the stream of oil flowing towards the oil outlet in the floor of the chamber and from the inwardly moving vortex of gas.

Another feature of the present invention is a conically tapered (funnel-shaped) mouth of the oil outlet.

A further feature of the present invention is the absence of a shrouded standpipe over the oil outlet.

An advantage of the present invention is increased efficiency of separation over a wide range of inlet flow rates and gas-to-liquid volumetric ratios and lower energy losses compared to conventional apparatus.

A further advantage of the present invention is that U.S. Pat. application of Aslin for Cyclonic System etc. certain embodiments of the apparatus may be retrofit into existing systems which use deaerating cyclonic particle separators such as those described in U.S. Pat. No. 4,282,016, wherein the gas outlet is axial at the top and the fluid outlet is radial or axial through the bottom. Thus the conventional separator may be removed from an existing installation and replaced with a separator embodying the present invention without there being a need to redesign or remanufacture the couplings thereto.

Other objects, advantages and features of the present invention will become apparent from a consideration of the drawings and the discussion which follows.

DESCRIPTION OF PREFERRED EMBODIMENTS

Figure 1:
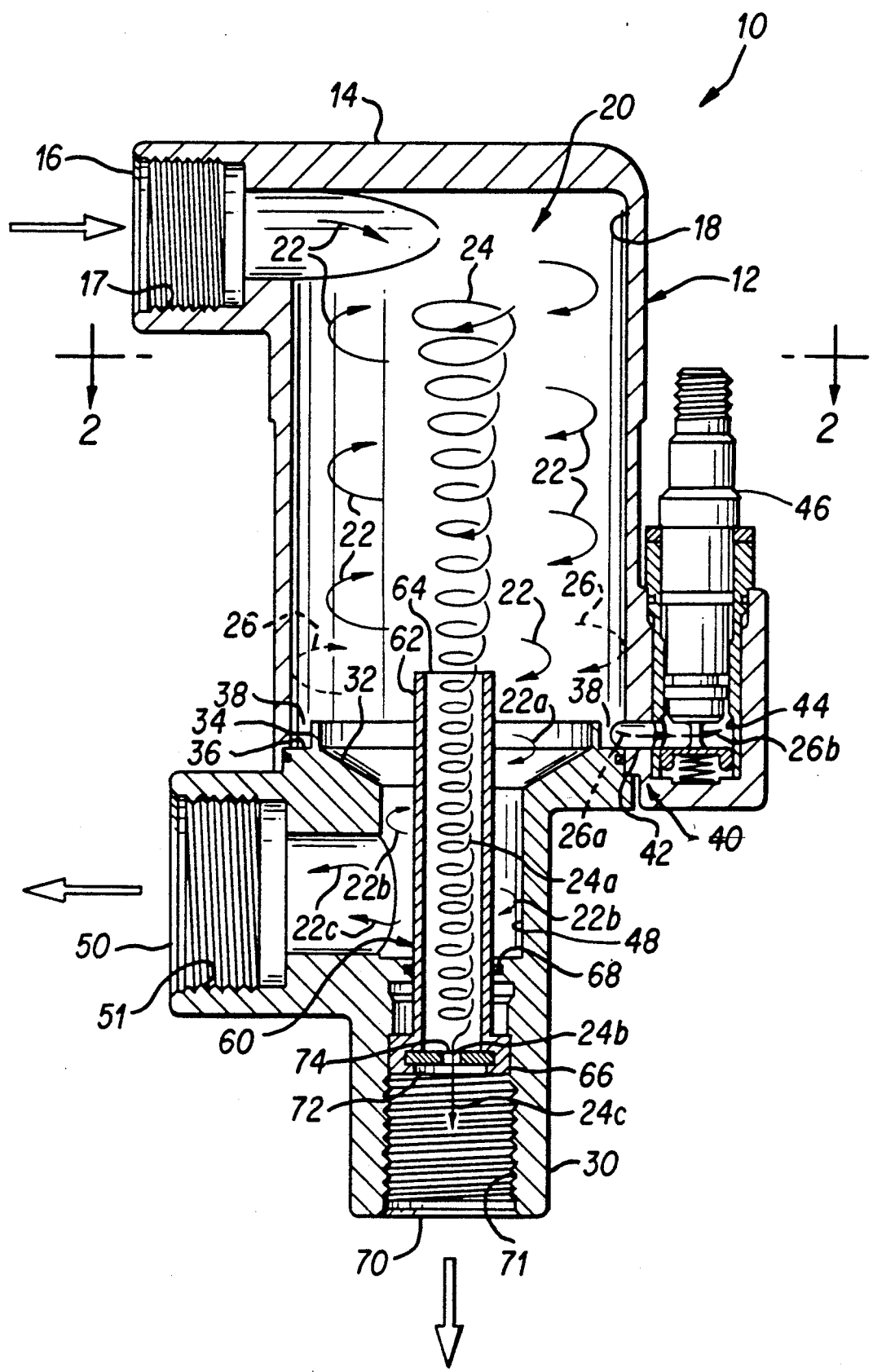
FIG. 1 is a vertical cross-section of a deaerating cyclonic particle separator of the present invention, in which the gas outlet and fluid outlets extend through the bottom of the apparatus.
Figure 2:
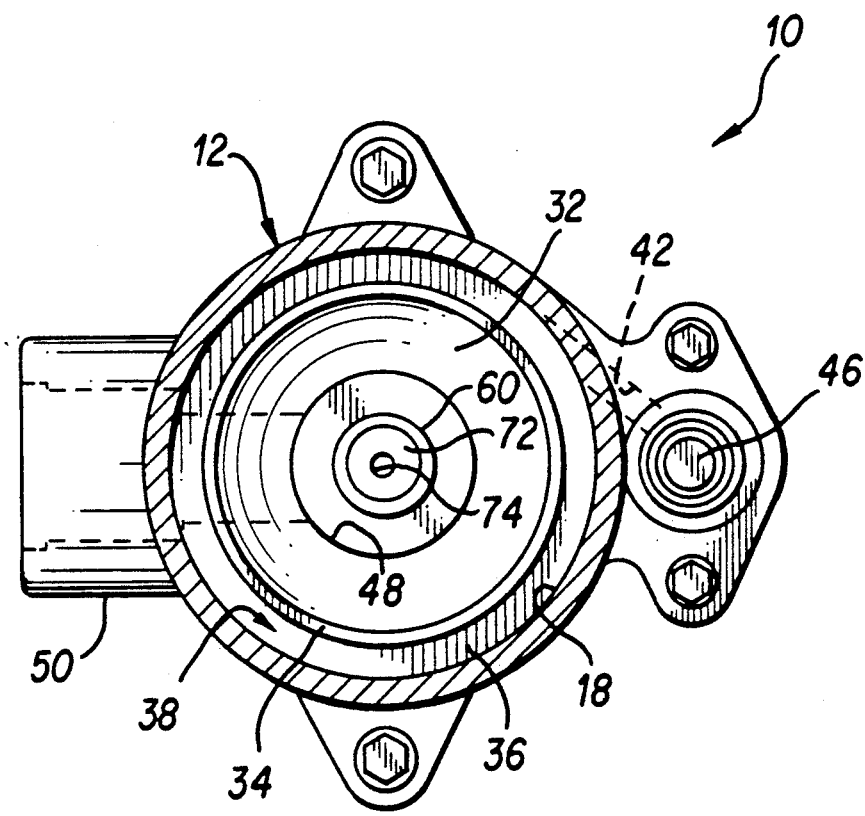
FIG. 2 is horizontal cross-section of the apparatus of FIG. 1, taken along the line 2—2.

Referring now to FIGS. 1 and 2, we see two views illustrating a preferred embodiment of a particle and gas separation apparatus 10 according to the present invention. In the preferred embodiment there illustrated, it comprises a hollow cylindrical housing 12 having an integral generally flat end cap which is designated the top 14. Although the terms "top" and "bottom" are used to designate certain parts of the apparatus, it is to be understood that the device may be installed and operated sideways or upside down with little change in efficiency of separation, inasmuch as the centrifugal forces generated herein are relatively greater than the force of gravity.

Built into and extending from the top of chamber wall 18 is inlet 16, which receives the fluid flow through a threaded or otherwise prepared coupling 17 from a fluid system such as an oil hydraulic system or the like (not shown) and is adapted to inject the fluid tangentially onto the smooth inner cylindrical wall 18 of the chamber 20 formed by the housing 12.

In an alternative embodiment (not shown) a plurality of inlets are employed to the same overall effect.

As the incoming fluid from inlet 16 impinges on the wall 18 as aforesaid, it is constrained to move in a downward spiral, or cyclone, within the chamber 20 (the spiral movement of the fluid being represented by the directional arrows 22).

As a result of differences in specific gravity, gaseous material is displaced to the center of the vortex about the axis of the chamber 20 (as represented by the directional arrows 24) while particulate debris tends to migrate to the U.S. Pat. application of Aslin for Cyclonic System etc. periphery of the spiraling fluid (as represented by the directional arrows 26).

The bottom element 30 of the housing 12 has an upper surface of which most of the area is conically tapered so as to form a hydrodynamic funnel-shaped mouth 32. The taper may vary in angle to form a gently curving hydrodynamic surface transitioning with the oil outlet connection 50.

Extending upwardly into the chamber 20 from the rim of the mouth 32 is a debris ring 34, which provides a vertical barrier to prevent particles that have been separated cyclonically from the fluid from escaping down the mouth 32. The surface of the chamber 20 extending outwardly from the debris ring 34 forms the floor 36 of an annular debris channel 38 which is bounded on the outside by the cylindrical wall 18 of the chamber 20, on its bottom by floor 36, on the inside by the debris ring 34, and is open on the top to the chamber 20.

When particulate debris moves in the spiral path 26 towards the periphery of the chamber 20, it is conducted into the debris channel 38, where such debris is protected by the debris ring 34 from experiencing centripetal drag forces that would otherwise conduct it into the mouth 32. Preferably, the debris ring extends into the chamber at least about the height of the debris window 40, and is spaced apart from the cylindrical wall 18 by a distance of from about one-tenth to about one-thirteenth the diameter of the chamber.

Extending tangentially through the housing wall 18 into the debris channel 38 is an exit 40 comprising an outlet 42 through which the debris is conducted to a port 44. Preferably a particle sensor 46, which may detect particles by magnetic, optical, eddy current or other physical properties, is installed in port 44. Port 44 may terminate (dead-end) at the sensor or alternatively may be connected to an outlet to provide a small continuous flow so that all U.S. Pat. application of Aslin for Cyclonic System etc. particles may be detected as they move past sensor 46.

The bottom of the mouth 32 communicates with a fluid channel 48, which in turn communicates with a fluid outlet 50 which includes a threaded or otherwise prepared coupling 51 for mating with tubing (not shown) communicating with the inlet to the hydraulic system.

Extending upwardly into the chamber 20 through and concentric with the fluid channel 48 is a vortex finder 60 which communicates with a gas outlet 70. The vortex finder 60 comprises an axially located tube 62 which extends through the bottom element 30 and into the chamber 20 so that its opening 64 is preferably above the top of the debris ring 34. Alternatively the opening 64 could be lower than the top of the debris ring 34.

The base 66 of the tube 62 is supported by the gas outlet 70, and 0-ring 68 seals the tube 62 from the fluid channel 48. Near the base 66 is an optional gas outlet orifice plate 72 having an orifice 74 of desired size therein for controlling the flow of gas therethrough.

OPERATION

In use, the fluid containing entrained gas and particulate matter enters the apparatus 10 through inlet 16 and moves in a spiral path 22. As mentioned previously, centrifugal forces on the particulate matter cause such debris to move in a wider spiral path 26, whereas displacement due to density differences causes the gaseous matter to assume a narrower spiral path, forming a vortex 24. Accordingly, as shown, the gaseous matter tends to move along path 24 into the vortex finder 60 along path 24a, through the orifice 74 along path 24b, and finally out the gas outlet 70 along path 24c.

Simultaneously, the particulate matter moves in a wide spiral 26 towards and into the debris channel 38 such that it U.S. Pat. application of Aslin for Cyclonic System etc. passes through the debris exit 40 along path 26a and into and through the debris port 44 along path 26b, where it is collected and/or detected, e.g. by the optional detector 46.

Thus the cyclonic particle and gas separator of the present invention separates the fluid, gas and particulate matter into three streams, and allows for the separation and detection of failure particles.

To describe the operation of such separators, several values are defined. For example, with reference to FIG. 1, air separation efficiency is the ratio of volume of air out orifice 70 to volume of air in orifice 16, expressed as a percentage. Desirable air separation efficiency in the range of about 92% to 99.5% is achieved by the apparatus of the present invention.

Oil separation efficiency is the ratio of the volume of oil out orifice 50 to the volume of oil in orifice 16, expressed as a percentage. Desirable oil separation efficiency in the range of about 92% to 99% is achieved by the apparatus of the present invention.

Debris capture efficiency (for particles of size x) is the ratio of number of particles x caught by the sensor to the number of particles x entering orifice 16, expressed as a percentage. Normally, capture efficiency tests are done for 1000-micron, 500-micron, and 250-micron particles, having the following dimensions and approximate capture efficiencies:

| Dimensions of particle | Capture efficiency |
| --- | --- |
| 1000 × 1000 × 100 micron | 100% |
| 500 × 500 × 50 micron | 100% |
| 250 × 250 × 25 micron | 80% |

U.S. Pat. application of Aslin for Cyclonic System etc.

Figure 5:
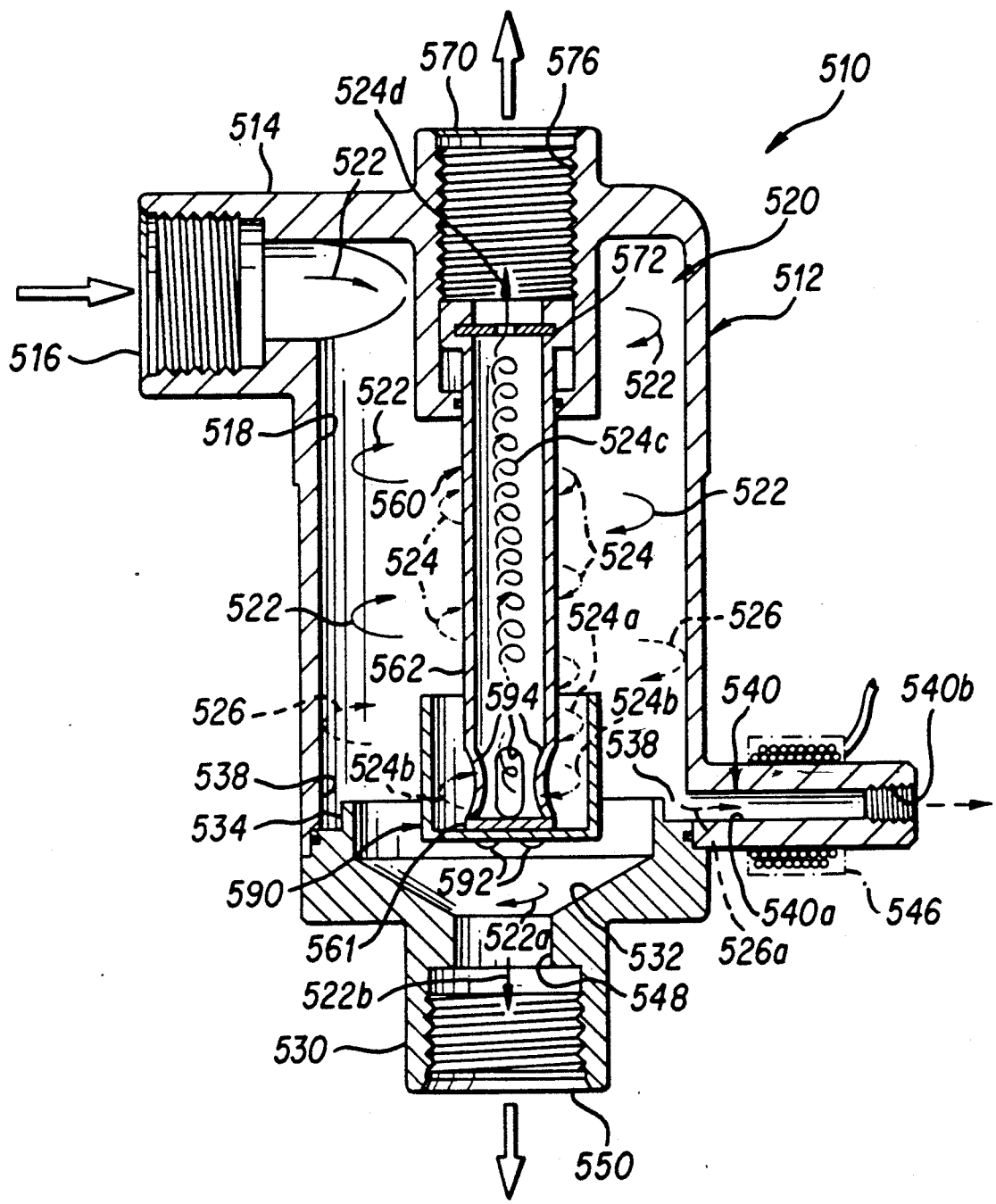
FIG. 5 is a view similar to FIG. 4 in which an air outlet reversing cap causes the vortex to reverse direction and debris flows through an underflow outlet.

Indication efficiency is an index of the ability of the system to indicate the number of particles of a size desired to be captured by the apparatus. For a given size particle, it is the ratio of particles indicated by the sensor to particles captured by the system. In the case of a flowthrough sensor, such as is shown in FIG. 5, it is the ratio of particles indicated to particles passing through the debris exit port.

In order to separate the particles, the fluid and the gas most efficiently, the size and positions of the various functional elements of the separator need to be optimized. For example, where the diameter of the apparatus is D the height of its chamber 20 is desirably from about 1.5 D to about 2 D. The vortex finder outside diameter can preferably be D/4.5 and has a length which causes its inlet to protrude a minimum of about D/6.7 above the top of the debris ring. The orifice 74 is specifically sized for the pressures encountered in the application and for the fluid-to-gas ratio.

Detector 46 may be any of the conventional designs such as the Q.D.M. ™ sensor available from the Tedeco division of Aeroquip Corporation, Glenolden, Pa. Alternatively, as described below in connection with FIG. 5, it may be a flow-through sensor.

NON-DEGASIFYING EMBODIMENT

Figure 3:
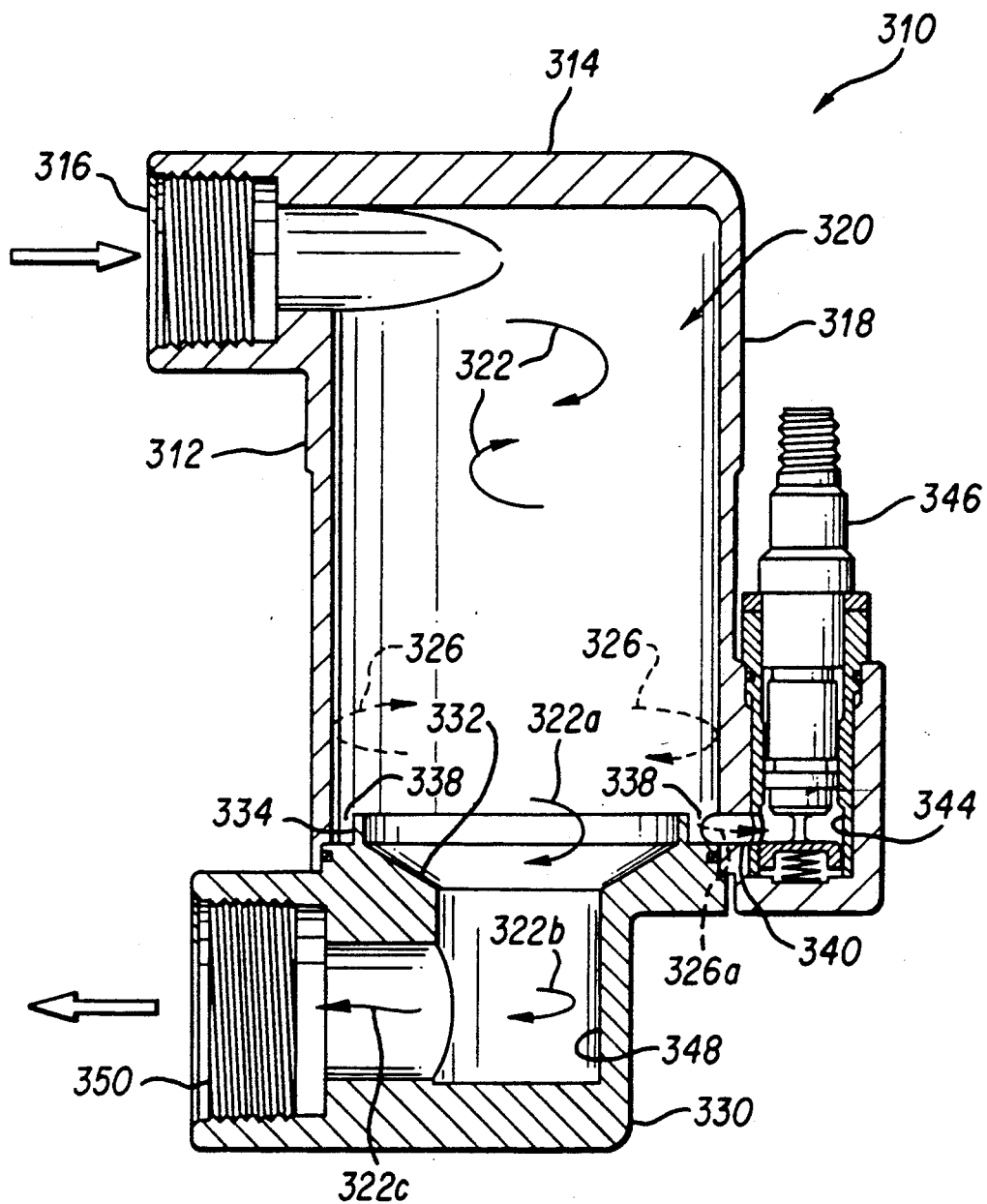
FIG. 3 is a vertical cross-section of an alternative embodiment of the present invention which provides particle separation but not deaeration of the fluid.

Turning to FIG. 3, it will be seen that the embodiment illustrated there is virtually the same as that shown in FIGS. 1 and 2, except that no vortex finder 60 or air outlet 70 are shown. Rather the embodiment of FIG. 3 is intended for use where degasification is not required. A vortex is formed and just channeled out the fluid outlet.

The apparatus 310 similarly comprises a housing 312 U.S. Pat. application of Aslin for Cyclonic System etc. forming a top 314, cylindrical wall 318 and fluid inlet 316. A bottom element 330 similarly forms a tapered mouth 332 having a debris ring 334 extending into the chamber 320 therefrom. Debris channel 338 similarly communicates with a tangential debris exit 340, including a debris port 344 and sensor 346.

The mouth 332 communicates with an axial fluid channel 348 and in turn with a radial fluid outlet 350. Other details are as generally described above.

In use, fluid containing particulate debris enters at the inlet 316 and moves along spiral path 322. As the particulate matter is affected by centrifugal force, it tends to move outwardly to path 326 and thence into the debris channel 338 and along path 326a through the debris exit 340 into port 344 and past sensor 346. The port 344 may be dead-ended or may provide for a continuous underflow, as desired.

At the same time, the fluid moves along path 322 and into the tapered mouth 332 along path 322a. From the mouth it continues moving in a spiral path 322b through fluid channel 348 until it is led to the fluid outlet 350 along path 322c. Due to its comparative simplicity, such a device is capable of generally efficient debris separation where de-aeration is not needed.

RETROFIT VERSION 1

Figure 4:
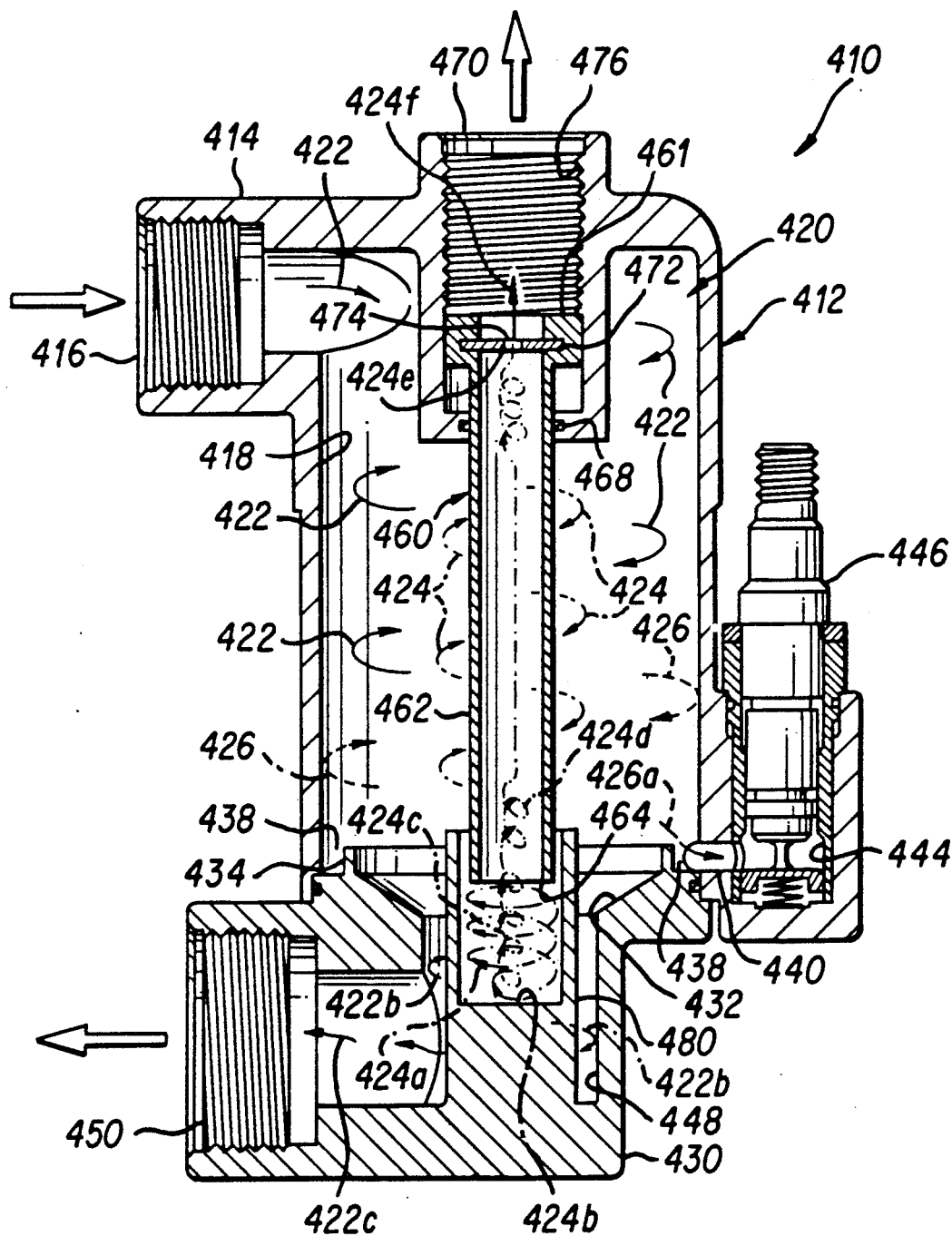
FIG. 4 is a vertical cross-section of an alternative embodiment of the present invention in which a standpipe causes the vortex to reverse direction at the bottom and the air outlet extends through the top of the chamber.

A preferred embodiment of the present invention is shown in FIG. 4. The separator 410 comprises a hollow cylindrical housing 412 having an integral top 414. Built into the top 414 is oil inlet 416, which receives the fluid from the oil hydraulic system (not shown and is adapted to inject the fluid tangentially to the smooth inner wall 418 of the hollow housing.

Top 414 further contains a gas outlet or discharge 470, U.S. Pat. application of Aslin for Cyclonic System etc. which comprises an axial channel 476 formed in and extending through the top 414 both above and below the level of the top 414. Extending into the channel 476 from the chamber 420 is the proximal end 461 of a vortex finder 460 which comprises an extended hollow tube 462. 0-ring 468 seals the end 461 of the tube 462 in the channel 476, and gas outlet orifice plate 472 provides an orifice 474 therein to control the flow of gas therethrough.

The distal end 464 of the tube 462 extends into a chamber defined by an air outlet standpipe 480. The standpipe 480 is a well-shaped protuberance extending upwardly from bottom element 430 into the fluid channel 448 to provide a boundary for the bottom of the gas vortex 424b and thereby cause the flow of air to reverse from a downwards spiral 424a to an upwardly flowing spiral 424c within the vortex finder 460.

In use, the fluid containing air and particulate debris flows into the apparatus through inlet 416 and begins to flow in a spiral path 422 around the lower portion of the air outlet 470, which extends into the chamber 420 from the top 414. As the fluid follows the cyclonic path 422, the gaseous material tends to separate towards the axis and form the vortex flow 424 around the tube 462.

The gaseous vortex 424 continues to spiral around the tube 462 towards its distal end 464, which extends into the air outlet standpipe 480. As the vortex enters the standpipe 480, it moves into the path labeled 424a, continues towards the bottom 424b, and then involutes upon itself and moves upwards in a narrower spiral path 424c still within the standpipe 480. The vortex 424 then enters the distal end 464 of the tube 462 of the vortex finder 460 and continues upwards therewithin along path 424d through the orifice 474 at point 424e, and into the air outlet 470 along path 424f.

Simultaneously therewith, the fluid spiral 422 moves in a path corresponding to that of the fluid spiral 22 in the U.S. Pat. application of Aslin for Cyclonic System etc. apparatus of FIG. 1. That is, spiral 422 enters the funnel-shaped mouth 432 at 422a and proceeds into the fluid channel 448 along path 422b, finally exiting the apparatus along path 422c through outlet 450.

Similarly, particulate matter is thrown outwardly along path 426, whereby it becomes trapped behind the debris ring 434 and flows out the tangential debris exit 440 along path 426a, encountering detector 446 in port 444.

It should be noted that the present apparatus 410 can be constructed from a conventional deaerating cyclonic separator such as one described in U.S. Pat. No. 4,282,016. This is capable of accomplishment because the structure of the housing 412 of this apparatus 410 is substantially similar to that of the housing of the apparatus of U.S. Pat. No. 4,282,016.

To perform such a "retrofit" operation, the bottom of the conventional separator would be removed and discarded, and an extended vortex finder tube 462 would be substituted for the conventional air outlet tube. A new bottom element 430 would be provided.

A significant difference between the present apparatus 410 and the prior art apparatus is that the vortex finder tube 460 completely prevents the upwardly spiraling gas 424d from coming into contact with the downwardly spiraling fluid 422. The only countercurrent activity in the system is in the air outlet standpipe 480, which is contained by the standpipe and causes no additional energy losses.

RETROFIT VERSION 2

Turning now to FIG. 5, the apparatus 510 is similar to the embodiment of FIG. 4, in that a vortex finder tube 562 extends into the chamber 520 from an air outlet 570 formed in the top 514. However, in place of the air outlet standpipe U.S. Pat. application of Aslin for Cyclonic System etc. 480 of the embodiment described previously, there is employed an air outlet reversing cap 590 at the distal end 561 of the tube 562. The cap is secured by a pair of rivets 592 to the end 561 of the tube 562, or alternatively is cast integrally therewith. Gas inlet holes 594 are formed in the cylindrical wall of the tube 562 near the end 561. Cap 590 is a well-shaped element having a function similar to that described for the standpipe 480.

The fluid outlet 550 of the apparatus 510 is axial, rather than radial as it is with each of the previously described embodiments. This configuration provides the simplest fluid path, because the fluid continues in a downwards direction out the outlet 550.

In use, oil with air and debris enters the inlet 516 and passes under the top 514 into chamber 520, where it is caused to move cyclonically along path 522 by cylindrical wall 512. The fluid moves along path 522 into funnel-shaped mouth 532, along path 522a and thenceforth out through outlet 550 along path 522b to the rest of the hydraulic system (not shown).

Simultaneously, the particulate matter moves along wider spiral path 526, is trapped behind the debris ring 534 and passes out the debris exit 540 along path 526a through underflow channel 540a,540b and out of the present apparatus to be collected elsewhere. The distal portion of the underflow channel 540b is desirably screw-threaded to facilitate coupling for this purpose to tubing (not shown). Optionally a flow-through debris detector, such as electromagnetic coil 546 or other detection means, may be installed in the path of the underflow channel 540a, and a valve or other means for regulating flow (not shown) may be interposed in the debris exit 540 as needed.

At the same time, the vortex of air 524 forms around the vortex finder 560 and moves along path 524 into the air outlet reversing cap 590 along path 524a, whereupon it passes U.S. Pat. application of Aslin for Cyclonic System etc. through gas inlet holes 594 along path 524b and reverses its direction, traveling upwardly within the tube 562 along path 524c, through orifice plate 572 and then out the air outlet 570 along path 524d.

The function of the reversing cap 590 is similar to that of the standpipe 480, but because the cap 590 is secured to the vortex finder 560, it does not require support from the bottom element 590 as does the standpipe 480. Thus an axial oil outlet 550 can be provided, rather than the radial outlet 450 on the previously described embodiment.

It will be apparent that a conventional cyclonic separator can be similarly retrofit to provide apparatus as shown in FIG. 5 by removing and discarding the original bottom element (not shown), providing an extended vortex finder tube 562 with reversing cap 590, and providing a bottom element 530 having a funnel-shaped mouth 532 and debris ring 534 as shown.

ALTERNATIVE VERSIONS 1 AND 2

Figure 6:
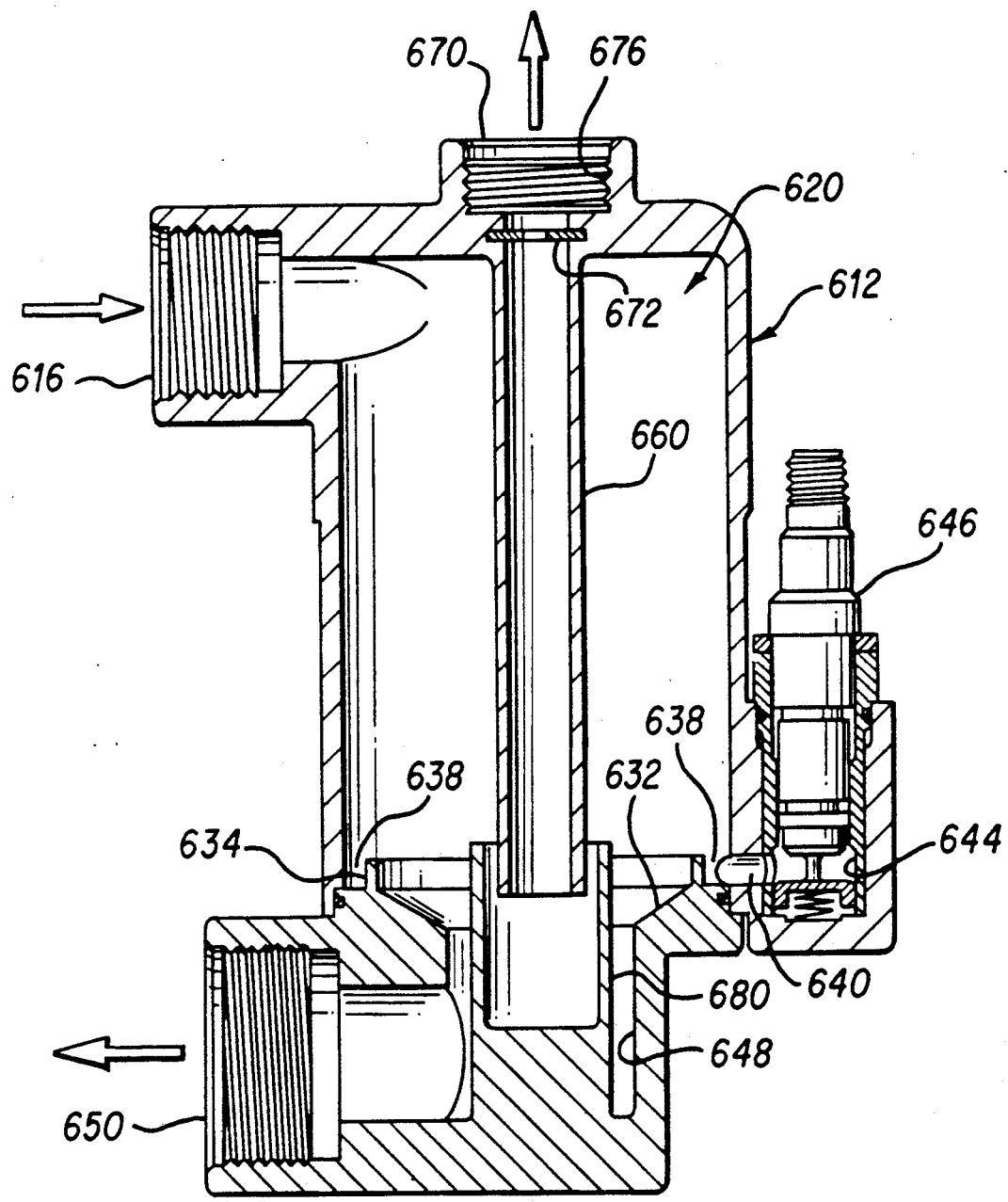
FIG. 6 is a vertical cross-section of an alternative embodiment of the apparatus of FIG. 4, in which the vortex finder extends from the top of the chamber.
Figure 7:
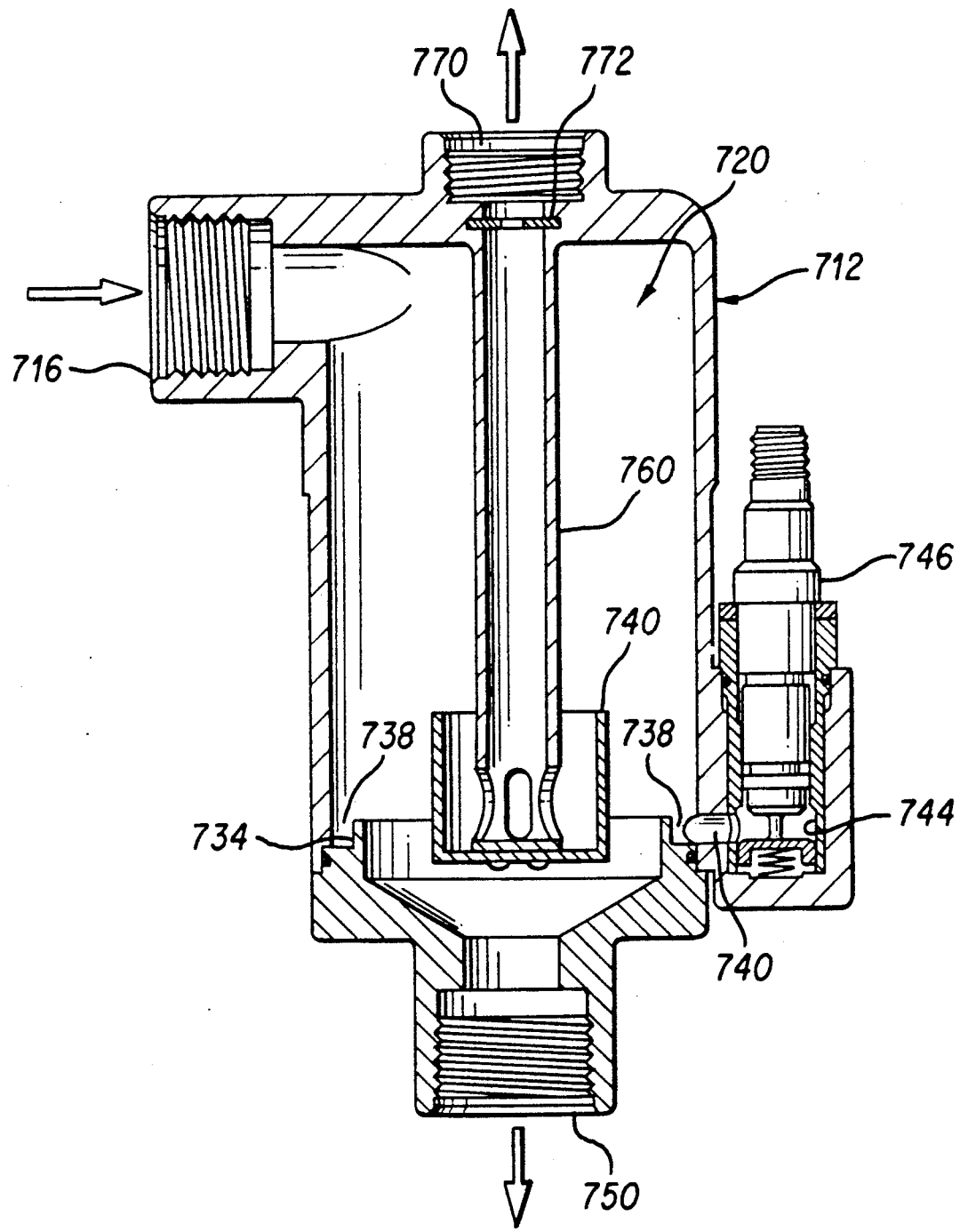
FIG. 7 is a a view similar to FIG. 6 of an alternative U.S. Pat. application of Aslin for Cyclonic System etc. embodiment of the apparatus of FIG. 6, in which an air outlet reversing cap is used.

FIGS. 6 and 7 illustrate two alternative versions of the apparatus of FIGS. 4 and 5 respectively. The difference between Retrofit Versions 1 and 2 (FIGS. 4 and 5) and Alternative Versions 1 and 2 (FIGS. 6 and 7) is that the Alternative Versions have the extended vortex finder element 660 and 760 formed integrally with the housing 612 and 712 rather than separately provided. Furthermore the Alternative Version 2 shown in FIG. 7 does not have a flow-through debris exit corresponding to 540b shown for Retrovit Version 2 in FIG. 5.

It will be seen from the illustrations that the other corresponding elements, e.g. the inlets 616 and 716, the chambers 620 and 720, the debris rings 634 and 734, the funnel-shaped mouth 632 and 732, the fluid channels 648 and U.S. Pat. application of Aslin for Cyclonic System etc. 748, the debris exits 640 and 740, the air outlet standpipe 680, the air outlet reversing cap 790, and the oil or fluid outlets 650 and 750, function identically to the corresponding elements previously described.

Although the present invention has been described with reference to the particular embodiments herein set forth, it is understood that the present disclosure has been made only by way of example and that numerous changes in the details of construction may be resorted to without departing from the spirit and scope of the invention. Thus the invention should not be limited by the foregoing specification but rather only by the scope of the claims appended hereto.

Having thus described the invention, what it is desired to claim and thereby protect by Letters Patent is:

1. A particle separator for use in a pressurized three-phase flow system to separate debris particles from liquids and or gases and to segregate them for subsequent removal comprising:
    a housing having a top end cap, a smooth inner cylindrical wall, and a bottom, together defining a chamber therein;
    a fluid inlet constructed to tangentially inject fluid into said housing near the top end cap and to cooperate with said housing such that when the fluid is injected through the fluid inlet it impinges on the inner cylindrical wall in a manner such that a downwardly directed spiral flow pattern is developed, said flow pattern generating a centrifugal force field which firstly causes the entrapped gases to coalesce substantially in the center of said flow pattern and secondly propels debris particles to the outer reaches of said pattern for eventual separation, capture and removal;
    fluid removal means having a fluid outlet in the bottom of said housing, said bottom having a funnel-shaped surface on the interior thereof, the funnel-shaped surface extending from a wide mouth beginning near but spaced apart from the inner cylindrical wall and tapering to a narrower fluid channel communicating with the fluid outlet;
    means for maintaining the separation of debris particles from the fluid, extending upwards a short distance into the chamber from said mouth and forming an annular debris channel between the exterior surface thereof and the portion of the cylindrical inner wall immediately adjacent to the bottom, whereby debris particles are segregated and trapped in the debris channel for subsequent removal from the system;
    a debris exit comprising a debris outlet from the debris channel extending tangentially through the cylindrical inner wall, the debris exit being arranged for receiving separated debris particles after they have been propelled out of said flow pattern by the force field, and means for capturing debris particles, connected to said debris outlet.

2. The particle separator of claim 1, wherein the fluid outlet extends radially through the bottom to communicate with the fluid channel.

3. The particle separator of claim 1, wherein the means for maintaining the separation of debris particles from the fluid is a ring extending upwardly from the mouth of the funnel-shaped surface.

4. The particle separator of claim 1, wherein the means for capturing debris particles comprises a debris port alongside said housing, the port further containing means for detecting and indicating the presence of debris particles.

5. The particle separator of claim 1, further comprising means for removing gases entrapped in the fluid, said means comprising:
    a gas outlet along the axis of said chamber; and
    a vortex finder comprising a hollow tube extending into the chamber concentric with the inner cylindrical wall and communicating with said gas outlet, the tube being arranged to intercept coalesced gases and conduct them into the gas outlet.

6. The particle separator of claim 5, wherein the fluid outlet extends radially through the bottom to communicate with the fluid channel.

7. The particle separator of claim 6, wherein the means for maintaining the separation of debris particles from the fluid is a ring extending upwardly from the mouth of the funnel-shaped surface.

8. The particle separator of claim 7, wherein the vortex finder extends downwardly into the chamber from a gas outlet which is integral with and extends upwardly from the top end cap of the housing.

9. The particle separator of claim 7, wherein the vortex finder extends downwardly into the chamber from a gas outlet which is integral with and extends downwardly into the chamber for a short distance from the top end cap of the housing.

10. The particle separator of claim 9, wherein the vortex finder extends downwardly into the chamber to a terminus lower than the top of the ring from a gas outlet which is integral with and extends downwardly into the chamber for a short distance from the top end cap of the housing, further comprising a gas outlet standpipe extending upwardly from the bottom through the fluid channel to a terminus slightly above the top of the ring.

11. The particle separator of claim 6, wherein the gas outlet is in the bottom.

12. The particle separator of claim 10, wherein the vortex finder extends through the fluid channel and above the ring.

13. The particle separator of claim 5, wherein the fluid outlet extends axially through the bottom to communicate with the fluid channel.

14. The particle separator of claim 13, wherein the gas outlet extends through the top end cap.

15. The particle separator of claim 14, wherein the means for maintaining the separation of debris particles from the fluid is a ring extending upwardly from the mouth of the funnel-shaped surface.

16. The particle separator of claim 15, wherein the vortex finder extends below the top of the ring and further comprises a gas outlet reversing cap at the bottommost portion of the hollow tube, the bottommost portion of the hollow tube having a plurality of openings formed therewithin.

17. The particle separator of claim 16, wherein the vortex finder extends downwardly into the chamber from a gas outlet which is integral with and extends upwardly from the top end cap of the housing.

18. The particle separator of claim 16, wherein the vortex finder extends downwardly into the chamber from a gas outlet which is integral with and extends downwardly into the chamber for a short distance from the top end cap of the housing.

19. The particle separator of claim 5, wherein the means for capturing debris particles comprises a debris port alongside said housing, the port further containing detecting means which includes a magnetic particle detector positioned with the magnet thereof across the debris outlet from the debris channel and constructed to signal the presence of trapped debris particles.

20. The particle separator of claim 5, wherein the vortex finder further comprises means for controlling the flow of gas through the hollow tube.

21. The particle separator of claim 20, wherein the means for controlling the flow of gas is a gas outlet orifice plate.

22. The particle separator of claim 5 wherein the means for maintaining the separation of debris particles from the fluid is a ring extending upwardly from the mouth of the funnel-shaped surface.

23. The particle separator of claim 22, wherein the vortex finder extends downwardly into the chamber from a gas outlet which is integral with and extends upwardly from the top end cap of the housing.

24. A method for retrofitting a particle separator, comprising the steps of:
  (a) providing apparatus comprising a housing having a top end cap, a smooth inner cylindrical wall, and a bottom, together defining a chamber therein, and further comprising a gas outlet in the top end cap of the housing, and further comprising a fluid inlet constructed to tangentially inject the fluid into said housing near the top end cap and to cooperate with said housing such that when the fluid is injected through the fluid inlet it impinges on the inner cylindrical wall in a manner such that a downwardly directed spiral flow pattern is developed, said flow pattern generating a centrifugal force field which firstly causes the entrapped gases to coalesce substantially in the center of said flow pattern and secondly selectively propels debris particles to the outer reaches of said pattern for eventual separation, capture and removal, and further comprising a debris exit arranged for receiving separated debris particles after they have been propelled out of said flow pattern by the force field comprising a debris outlet from the debris channel extending tangentially through the cylindrical inner wall and means for capturing and detecting the presence of debris particles, connected to said debris outlet;
  (b) removing the bottom of said apparatus and securing to the gas outlet in communication therewith a vortex finder which comprises a hollow tube extending into the chamber concentric with the inner cylindrical wall and communicating with said gas outlet, the tube being arranged to intercept coalesced gases and conduct them into the gas outlet, the hollow tube extending below the top of the ring and said vortex finder further comprising a gas outlet reversing cap covering and shrouding the bottommost portion of the hollow tube, the bottommost portion of the hollow tube having a plurality of openings formed therewithin; and
  (c) replacing the bottom of said apparatus with a new bottom which comprises:
    fluid removal means having a fluid outlet in the bottom of said housing, said bottom having a funnel-shaped surface on the interior thereof, the funnel-shaped surface extending from a wide mouth beginning near but spaced apart from the inner cylindrical wall and tapering to a narrower fluid channel communicating with the fluid outlet; and
    means for maintaining the separation of debris particles from the fluid, extending upwards a short distance into the chamber from said mouth and forming an annular debris channel between the exterior surface thereof and the portion of the cylindrical inner wall immediately adjacent to the bottom, whereby debris particles are segregated and trapped in the debris channel for subsequent removal from the system;
whereby the new apparatus has improved separation efficiencies for all phases and lower energy losses compared with the apparatus originally provided.

* * * * *

UNITED STATES PATENT AND TRADEMARK OFFICE
CERTIFICATE OF CORRECTION

PATENT NO. : 5,028,318

DATED : July 2, 1991

INVENTOR(S) : David J. Aslin

It is certified that error appears in the above-identified patent and that said Letters Patent is hereby corrected as shown below:

Col. 12, line 61, "10" should read --11--.

Signed and Sealed this

Twentieth Day of April, 1993

*Attest:*

MICHAEL K. KIRK

*Attesting Officer*   *Acting Commissioner of Patents and Trademarks*